June 6, 1967 R. W. KETCHLEDGE 3,324,465

DIGITAL SURFACE-POSITIONING ARRANGEMENT EMPLOYING GRAY CODING

Filed Oct. 21, 1964 2 Sheets-Sheet 1

INVENTOR
R. W. KETCHLEDGE
BY Lucian C. Canepa
ATTORNEY

June 6, 1967 R. W. KETCHLEDGE 3,324,465

DIGITAL SURFACE-POSITIONING ARRANGEMENT EMPLOYING GRAY CODING

Filed Oct. 21, 1964 2 Sheets-Sheet 2

3,324,465

DIGITAL SURFACE-POSITIONING ARRANGEMENT EMPLOYING GRAY CODING

Raymond W. Ketchledge, Rumson, N.J., assignor to Bell Telephone Laboratories, Incorporated, New York, N.Y., a corporation of New York Filed Oct. 21, 1964, Ser. No. 405,554
12 Claims. (Cl. 340—347)

This invention relates to electronic control circuits and, more specifically, to a digitally-operative surface-positioning servomechanism.

Prior art servo arrangements have employed closed loop feedback systems to position a mechanical surface in accordance with digital input information signals. Typically, such systems employ feedback sensing elements which supply parallel digital signals which indicate the present position of the surface under control. Such signals are then electronically compared with the digital input energizations to determine the sign of the positioning error. However, where the input digital information is supplied in serial form, such prior art servo embodiments require storage elements to effect the error comparison between the serial input and parallel fed-back digital information.

Moreover, it has heretofore been recognized that transition sampling errors are minimized in digital servo arrangements which employ Gray-coded feedback digital information, wherein the value of only one digit is changed in the binary words characterizing any two contiguous mechanical surface orientations. Where such a coding is utilized, prior art embodiments have required additional storage and/or combinatorial logic structures to effect an error comparison between the fed-back digits and the binary, or pseudo-binary coded input control signals.

It is therefore an object of the present invention to provide an improved digital servo arrangement.

More specifically, an object of the present invention is the provision of a digitally-operative control embodiment ment for positioning a mechanical surface in accordance with a regularly-recurring Gray-coded serial input word.

It is another object of the present invention to provide a digital servo embodiment which may advantageously be relatively simply and inexpensively constructed, and which efficiently compares a Gray-coded serial input word with a parallel Gray-coded fed-back word.

These and other objects of the present invention are realized in a specific illustrative digitally-operative servomechanism for positioning a mechanical surface in accordance with an input Gray-coded serial bit stream. The embodiment includes a first bistable flip-flop for controlling the direction of rotation of a surface-positioning motor, and a second bistable flip-flop for selectively disabling the first such embodiment.

In addition, a commutator and a plurality of Gray code operative feedback transfer switches are employed to selectively couple the serial input information to the two bistable arrangements. If the instantaneous mechanical surface orientation does not correspond to the position specified by the input coded word, the two flip-flops are functionally adapted to activate the motor in a direction to obviate the positioning error.

It is thus a feature of the present invention that a digital servo arrangement include a surface-positioning motor, a source of Gray-coded input signals, and feedback control circuitry including a plurality of Gray code operative transfer switches and two bistable flip-flops for activating the motor in a direction to obviate any difference between the instantaneous mechanical surface position and the position specified by the serially-supplied input signals.

It is another feature of the present invention that a digitally-operative servo system include an output controlling element, circuitry for suplying Gray-coded present state information in parallel form, an input source for serially supplying next state Gray-coded information, a first flip-flop for counting the binary 1's appearing in the input word, and a second flip-flop responsive to a mismatch between an input digit and the corresponding fedback digit for enabling the output controlling element in a mode dependent upon the state of the first flip-flop.

It is still another feature of the present invention that a digital servo arrangement include a surface-positioning motor, a first bistable flip-flop connected to the motor, a second bistable flip-flop for selectively inhibiting switching in the first flip-flop and for rendering the motor responsive to the particular state of the first flip-flop, circuitry for serially supplying Gray-coded binary input information, and a plurality of feedback transfer switches selectively set in accordance with a Gray-coded representation of the position of a mechanical surface for switching the first flip-flop responsive to each binary 1 signal supplied by the input source and for switching the second flip-flop responsive to a mismatch between an input digit and the relative setting of a corresponding one of the transfer switches.

A complete understanding of the present invention and of the above and other features, advantages and variations thereof, may be gained from a consideration of the following detailed description of an illustrative embodiment thereof presented hereinbelow in conjunction with the accompanying drawing, in which.

Figure 1:
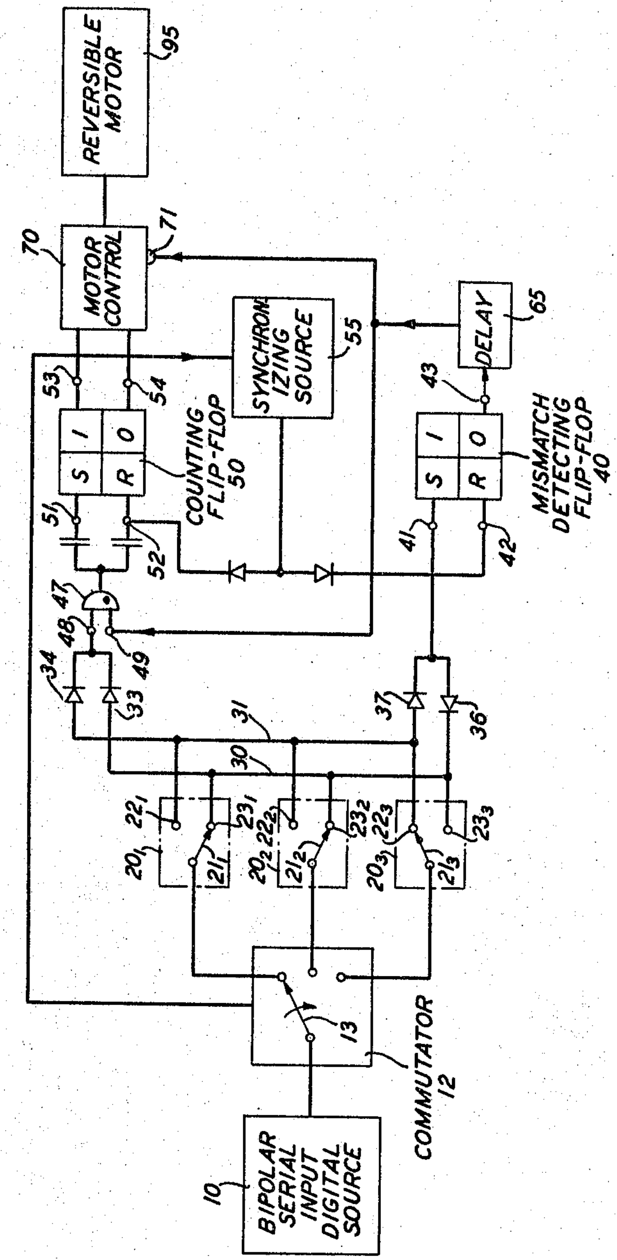
FIG. 1 is a schematic diagram of a specific, illustrative digital servo arrangement which embodies the principles of the present invention.

Referring now to FIG. 1, there is shown a digitally-operative servo arrangement for selectively positioning a mechanical surface. The arrangement comprises a source 10 of bipolar, serially-supplied input digits which is sequentially connected by a rotating member 13, included in a commutator 12, to three feedback transfer switches $\mathbf{20}_1$ through $\mathbf{20}_3$. Each of the switches 20 includes a common transfer member 21 which is selectively connectable to one of two associated contact terminals 22 and 23, with the switch terminals $\mathbf{22}_1$ through $\mathbf{22}_3$ and $\mathbf{23}_1$ through $\mathbf{23}_3$ being respectively multiplied onto two common conductors 30 and 31.

The conductors 30 and 31 are joined by two oppositely-poled rectifying diodes 36 and 37 to a set input terminal 41 included on a mismatch detecting flip-flop 40, and further connected by two similarly-poled diodes 33 and 34 to an input terminal 48 of an AND logic gate 47. The bistable embodiment 40 is responsive to either a positive or negative input energization respectively supplied thereto by the diodes 37 or 36 for switching to the set, or 1 state. A delaying element 65 is employed to connect the 0 output terminal 43 of the flip-flop 40 to a second input terminal 49 of the AND gate 47. Responsive to relatively high voltage signals being coincidently supplied to the two input terminals 48 and 49 thereon, the gate 47 is operative to supply a relatively high potential pulse to each of two set and reset input terminals 51 and 52 on a counting flip-flop 50. This pulse functions to switch the bistable state of the embodiment 50 independent of its prior operative condition.

A motor-controlling embodiment 70 is connected to the 1 and 0 output terminals 53 and 54, respectively, of the flip-flop 50, with the control unit 70 being operative, upon receiving a relatively low voltage at an inhibiting input terminal 71 thereon, to activate a mechanical surface-positioning motor 95. More particularly, the control unit 70 responds to a relatively low voltage enabling signal at the terminal 71 by activating the motor 95 in a clockwise or a counter-clockwise direcion when one of the counting flip-flop output terminals 53 and 54 is respectively characterized by a relatively high potential. Finally, a synchronizing source 55 is employed to energize two reset terminals 42 and 52 respectively included on the flip-flops 40 and 50 once during each operative cycle of the FIG. 1 arrangement, prior to the time when the rotating commutator member 13 is connected to the first, or upper transfer switch 201.

The source 10 is adapted to continuously supply three recurring, Gray-coded input digital pulses to position a movable surface to a corresponding one of eight discrete positions. For example, examining the arrangement shown in FIG. 2, which is considered in detail hereinbelow, the motor 95 is operable to adjust the spacing $d$ between a fixed surface 90 and a movable surface 91 to a desired one of eight discrete values.

The serial digital words supplied by the bipolar source 10 are listed in Table I infra, with the source 10 supplying the digits of any word in a left to right order, and wherein binary 1 and 0 entries are respectively embodied by positive and negative pulses.

TABLE I

| Surface Position | Digits Supplied By the Source 10 | | |
|---|---|---|---|
| 1 | 0 | 0 | 0 |
| 2 | 0 | 0 | 1 |
| 3 | 0 | 1 | 1 |
| 4 | 0 | 1 | 0 |
| 5 | 1 | 1 | 0 |
| 6 | 1 | 1 | 1 |
| 7 | 1 | 0 | 1 |
| 8 | 1 | 0 | 0 |

It is observed that the eight digital words included in Table I are Gray-coded, such that the digit value of only one bit location changes between any two adjacent entries. In addition, the eight Table I entries are advantageously disposed to represent consecutively ordered, discrete positions for the movable surface under control. With reference to the two surfaces 90 and 91 shown in FIG. 2, the tabulated Gray-coded words characterize, in a top to bottom order, an increasing surface separation $d$.

The three transfer switches $20_1$ through $20_3$ are functionally adapted to embody Gray-coded information relating to the present position of the movable mechanical surface to be controlled, viz. the surface 91. In particular, letting the binary values 0 and 1 respectively characterize the switch terminals 22 and 23, the switch transfer arms $21_1$ through $21_3$ are selectively connected to the associated contacts $22_1$ through $22_3$ and $23_1$ through $23_3$ in a pattern which identifies the present mechanical surface position. Thus, for example, when the movable surface 91 resides at a position corresponding to the fifth binary word 110 illustrated in Table I, the switch transfer arms $21_1$, $21_2$ and $21_3$ are respectively connected to the terminals $23_1$, $23_2$ and $22_3$. It is noted that this condition is depicted in FIGS. 1 and 2.

Figure 2:
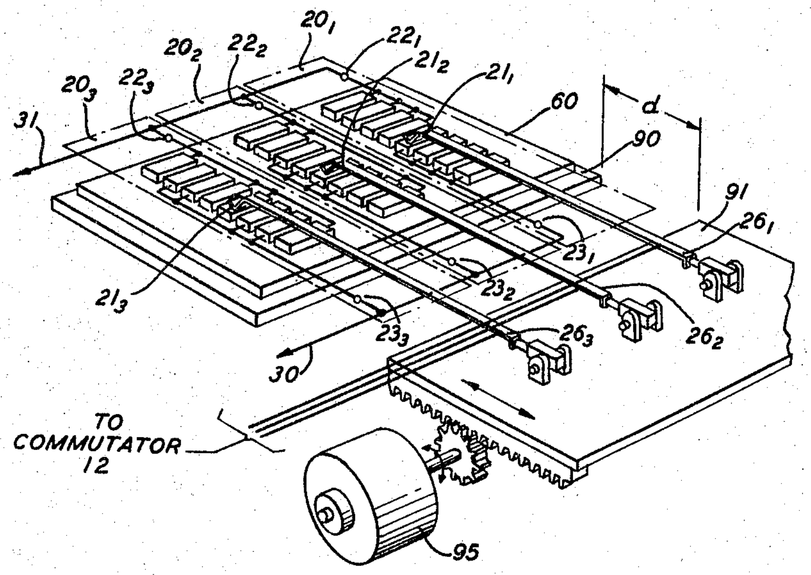
FIG. 2 is a diagram illustrating a particular embodiment of a plurality of transfer switches 20 shown in FIG. 1.

A specific, illustrative embodiment of the switches $20_1$ through $20_3$ is shown in FIG. 2, with like reference numerals being employed to identify corresponding circuit elements in FIGS. 1 and 2. The switches $20_1$ through $20_3$ are mounted on a circuit board 60 which is fixed to the stationary surface 90. Each switch 20 comprises eight electrically-insulated conducting segments which are selectively connected in a Gray-coded pattern to an associated one of the two contact terminals 22 and 23. That is, letting the binary values 0 and 1 respectively represent connections to the terminals 22 and 23, consecutive sets comprising the three associated position-indicating conducting segments included in the switches $20_1$ through $20_3$, when considered in the order $20_1$, $20_2$ and $20_3$, generate the eight Gray code entries enumerated in Table I.

Three conducting wiper members $21_1$ through $21_3$, connected by an associated set of conducting rigid mechanical arms $26_1$ through $26_3$ to the surface 91, are respectively operative to traverse across an associated set of conducting segments responsive to any lateral movement of the mechanical surface 91. For any discrete positioning of the surface 91, the wipers $21_1$ through $21_3$ are selectively connected to the associated terminals $22_1$ through $22_3$ or $23_1$ through $23_3$ in accordance with the digital entries in Table I. For example, for a separation $d$ corresponding to the fifth Table I entry, as shown in FIG. 2, the wiper members $21_1$ through $21_3$ are respectively connected to the terminals $23_1$, $23_2$ and $22_3$. Employing the binary 1 and 0 convention described above, it is observed that this switch interconnection pattern corresponds to the requisite binary word, viz. 110. Hence, the embodiments $20_1$ through $20_3$ shown in FIG. 2 perform the Gray-coded switching functions attributed to the similarly designated, schematically-depicted arrangements shown in FIG. 1.

In over-all terms, the FIG. 1 arrangement is operative to compare a serial Gray-coded input word supplied by the source 10 with the Gray-coded settings of the transfer switches $20_1$ through $20_3$, which settings embody the present mechanical surface position information, and to energize the motor 95 in a direction to eliminate any existing positioning error. As a basic underlying algorithm, the input and fed-back Gray-coded information is sequentially compared on a bit-by-bit basis, and the motor is energized in a direction indicated by the mismatch in the most significant bit location, except that a polarity reversal is effected if there are an odd number of binary 1's (i.e., positive pulses) in the input serial word up to and including the digit position embodying the mismatch. In the context of the FIG. 1 arrangement, the input digits shown in Table I decrease in significance in a left to right order, while the feedback switches decrease in significance in the order $20_1$, $20_2$ and $20_3$.

For example, letting the fifth and seventh words in Table I respectively represent the present and next position information for the surface 91 under control, a subtraction of these words, viz. 101–110, yields a negative mismatch in the second bit location and a total of one binary 1 appearing in the first two locations of the assumed input or next-position word 101. Thus, in accordance with the above-described algorithm, the negative sign of the mismatch is reversed to yield a positive error, which indicates that a higher position has been subtracted from a lower such number. By comparing any two quantities of Table I in the above-described manner, positive and negative error signals are respectively generated whenever a higher number is subtracted from a lower position number in Table I, and vice versa.

It is noted that positive and negative error signs respectively indicate that a wider or a narrower separation $d$ is desired between the surfaces 90 and 91. Accordingly, as will be more fully described hereinbelow, the motor control unit 70 shown in FIG. 1 is operative in response to positive and negative error polarities for respectively activating the motor 95 in a clockwise and counter-clockwise direction, thereby opening and closing the separation $d$ shown in FIG. 2 until the position specified by the input word is attained.

Assume now that the movable surface 91 is in a position corresponding to the fifth surface separation, as shown in FIG. 2. Correspondingly, the transfer switch members $21_1$, $21_2$ and $21_3$ respectively reside in the 1, 1 and 0 states, with these members being connected to the associated terminals $23_1$, $23_2$ and $22_3$, as shown in FIGS.

1 and 2. Assume further, that it is desired to open the separation between the surfaces 90 and 91 shown in FIG. 2 to the sixth discrete position identified by the binary word 111. To effect this result, the bipolar source 10 serially supplies a recurring binary word comprising three successive positive pulses which begin at the times *a*, *c* and *f* shown in FIG. 3C. These pulses are representative of the word 111.

Prior to the time *a* when the commutator arm 13 is connected to the first switch $\mathbf{20_1}$, the synchronizing source 55, under control of the commutator 12, energizes the reset terminals 42 and 52 on the flip-flops 40 and 50. Hence, the circuit combinations 40 and 50 reside in the reset, or 0 states shown in FIGS. 3A and 3B preceding the time *a*, with relatively high and relatively low potentials respectively appearing at the 0 and 1 output terminals thereon. The relatively high potential at the flip-flop 40 0 output terminal 43 is coupled by the delaying element 65 to the AND gate input terminal 49, hence partially enabling this embodiment. Moreover, the relatively high voltage supplied by the delaying element 65 is adapted to inhibit operation of the motor control unit 70 by energizing the inhibiting input terminal 71 thereon.

Figure 3A:
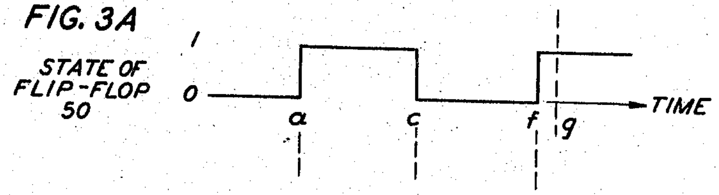
FIGS. 3A through 3C comprise a set of timing diagrams depicting the signal waveforms associated with selected circuit elements shown in FIG. 1.
Figure 3B:
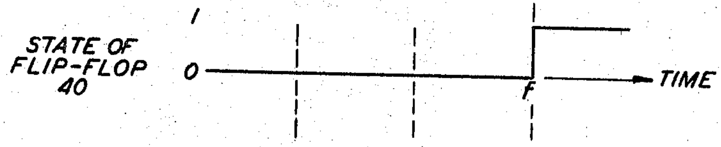
Figure 3C:
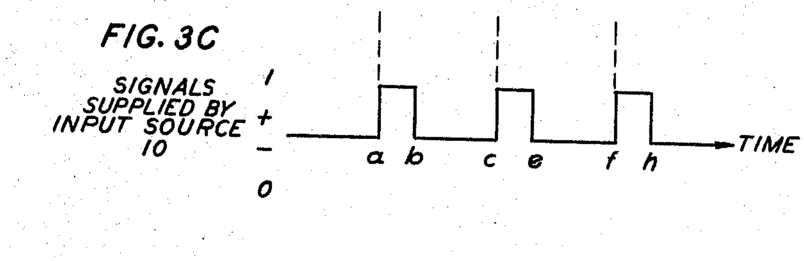

At the time *a* shown in FIGS. 3A and 3C, the commutator arm 13 is connected to the feedback transfer switch $\mathbf{20_1}$, and the input source 10 functions to supply the first input digit, viz. a positive pulse which represents the leftmost binary 1 included in the sixth position indicating input binary word 111. This positive pulse is passed by the switch member $\mathbf{21_1}$ to the associated contact terminal $\mathbf{23_1}$, and thereby also to the conductor 30. Since the switch $\mathbf{20_1}$ is set in accordance with the left binary 1 of the fifth position indicating word 110, and the input source 20 is similarly supplying a binary 1, no mismatch occurs in this particular digit location. Accordingly, the positive signal on the conductor 30 is blocked by the diode 36 from supplying a set energization to the mismatch detecting flip-flop 40. Moreover, since the input bit comprises a binary 1, the energized lead 30 switches the counting flip-flop 50 to the set state by way of the diode 33 and the AND gate 47, which is fully enabled at this time. Thus, for an interval following the time *a* shown in FIGS. 3A and 3B, the flip-flops 50 and 40 respectively reside in the 1 and 0 states.

At some later time *c* shown in FIGS. 3A and 3C, the second binary 1 input signal is passed by the commutator 12 and the transfer switch $\mathbf{20_2}$ to the conductor 30. In correspondence with the above-described circuit operation, the mismatch detecting flip-flop 40 is unresponsive to this energization since the switch transfer member $\mathbf{21_2}$ is also set in accordance with a binary 1. Further, the activated conductor 30 again fully enables the AND gate 47, hence supplying a resetting energization to the flip-flop 50. Thus, for an interval following the time *c* depicted in FIGS. 3A and 3B, the flip-flops 40 and 50 both reside in the 0 state, respectively indicating that no mismatch between the input and fed-back information has occurred, and that an even number of binary 1 digits has been included in the input word.

At the time *f* illustrated in FIG. 3C, the input source 10 supplies the third input positive binary 1 pulse via the commutator arm 13 to the switch $\mathbf{20_3}$. However, since the switch transfer member $\mathbf{21_3}$ is connected to the terminal $\mathbf{22_3}$ in accordance with a Gray-coded fed-back binary 0, this positive pulse is coupled to the conductor 31. The positive signal on the conductor 31 is passed by the diode 37 to the set terminal 41 of the mismatch detecting flip-flop 40, which hence switches to the 1 state thereby supplying a relatively low potential to the 0 output terminal 43 included thereon.

The positive energization on the conductor 31 is also coupled by the diode 34 to the AND gate input terminal 48. Since the delay element 65 inhibits the relatively low flip-flop 40 output signal from being immediately detected at the AND gate input terminal 49, the gate 47 is fully enabled by the conducting diode 34 at the time *f*, and this embodiment switches the counting flip-flop 50 to the set or 1 state. Hence, for an interval following the time *f* shown in FIG. 3A, a relatively high potential appears at the 1 output terminal 53 of the counting flip-flop 50.

At the time *g* shown in FIG. 3A, the relatively low potential appearing at the mismatch detecting flip-flop 40 output terminal 43 translates through the delaying element 65 and appears at the gate input terminal 49. This signal prevents further switching of the AND gate 47 and also enables the motor-controlling embodiment 70 by de-energizing the inhibiting input terminal 71 thereon. As discussed hereinabove, the unit 70 is operative in response to a relatively high potential appearing at the counting flip-flop 50 output terminal 53 for activating the motor 95 in a clockwise direction. Referring to FIG. 2, it is observed that clockwise rotation of the motor 95 widens the distance *d* between the surfaces 90 and 91, hence effecting the desired result.

The above-described operation recurs each time the binary word 111 is supplied by the input source 10 to the commutator 12 until the feedback switches $\mathbf{20_1}$ through $\mathbf{20_3}$ attain the corresponding 111 settings which indicate that the surface 91 has been properly positioned. In the particular example chosen for illustration, only the switch transfer member $\mathbf{21_3}$ need be connected to the terminal $\mathbf{23_3}$ in place of the terminal $\mathbf{22_3}$. When the proper surface positioning has been effected, i.e., when the sixth surface separation has been attained, hence resulting in 1, 1 and 1 binary settings for the switches $\mathbf{20_1}$ through $\mathbf{20_3}$, respectively, the mismatch indicating flip-flop 40 is no longer periodically switched to the set state by any of the positive input digits and, correspondingly, the motor 95 is not activated by the control unit 70.

By a mode of operation similar to that described above, the FIG. 1 arrangement may be shown to properly position the surface 91 in accordance with any desired input bipolar word independent of the original position of the surface 91. In general terms, positive binary 1 input pulses routed by the switches $\mathbf{20_1}$ through $\mathbf{20_3}$ to either of the conductors 30 or 31 cycle the counting flip-flop 50. In addition, mismatch-indicating positive and negative input pulses which respectively appear on the conductors 31 and 30 set the mismatch detecting flip-flop 40 to the 1 state. The control unit 70, in turn, responds to a set flip-flop 40 by activating the motor 95 in a clockwise or counter-clockwise surface-positioning direction when the counting flip-flop 50 has respectively detected an odd and an even number of input binary 1's in the input bit locations up to and including the mismatched digit.

Summarizing the basic concepts of an illustrative embodiment of the present invention, a digital servomechanism is operative to position a mechanical surface in accordance with an input Gray-coded serial digital word. The embodiment includes a first bistable flip-flop for controlling the direction of rotation of a surface-positioning motor, and a second bistable flip-flop for selectively disabling the first such embodiment.

In addition, a commutator and a plurality of Gray code operative feedback transfer switches are employed to selectively couple the serial input information to the two bistable arrangements. If the instantaneous mechanical surface orientation does not correspond to the position specified by the input coded word, the two flip-flops are functionally adapted to activate the motor in a direction to obviate the positioning error.

It is to be understood that the above-described arrangement is only illustrative of the application of the principles of the present invention. Numerous other arrangements may be devised by those skilled in the art without departing from the spirit and scope of the invention. For example, the FIG. 1 arrangement may be employed to position surfaces in a desired angular relationship, such as an airplane wing and an associated, rotatably-mounted flap, rather than controlling the planar separation of two surfaces as shown in FIG. 2.

What is claimed is:

1. A digital servo system for positioning a movable mechanical surface comprising a surface-positioning motor, a first bistable flip-flop connected to said motor, a second bistable flip-flop for selectively inhibiting switching in said first flip-flop and for rendering said motor responsive to the particular bistable state of said first flip-flop, source means for serially supplying Gray-coded binary input information, and a plurality of feedback transfer switch means selectively set in accordance with a Gray-coded representation of the position of said mechanical surface for switching said first flip-flop responsive to each binary 1 signal supplied by said input source means and for switching said second flip-flop responsive to a mismatch between an input digit and the particular setting of a corresponding one of said switch means.

2. A combination as in claim 1, wherein each of said feedback transfer switch means comprises a plurality of insulated conducting segments interconnected in accordance with a Gray code, and conducting wiper means for selectively translating across said conducting segments.

3. A combination as in claim 2, further comprising delaying means and AND logic means interconnecting said first and second flip-flops.

4. A combination as in claim 3 further comprising commutating means for sequentially connecting said input source means to each of said feedback transfer switch means.

5. A combination as in claim 4, further comprising motor controlling means for activating said surface-positioning motor in a direction dependent upon the particular bistable state characterizing said first flip-flop.

6. In combination in a digital servo system, output controlling means, Gray-coded feedback means for supplying present state digital information in parallel form, an input source for serially supplying next state Gray-coded information, a first flip-flop for counting the binary 1's included in said input information supplied by said input source, and a second flip-flop responsive to a mismatch between an input digit and the corresponding feedback digit respectively supplied by said input source and said feedback means for enabling said output controlling means in a mode dependent upon the particular stable state of said first flip-flop.

7. A combination as in claim 6, further comprising delaying means connected between said second flip-flop and said output controlling means.

8. A combination as in claim 7, further comprising means connected between said delaying means and said first flip-flop for selectively inhibiting switching of said first flip-flop.

9. A combination as in claim 8, wherein said feedback means comprises a plurality of transfer switches selectively set in accordance with a Gray code, and a commutator for sequentially connecting said input source to each of said transfer switches.

10. In combination, an input source of serial Gray-coded binary 1 and 0 digits, first and second conductors, feedback switching means for sequentially connecting said input source to said first and second conductors in accordance with 1 and 0 entries included in a Gray coding, a counting bistable embodiment responsive to a binary 1 signal appearing on either of said first and second conductors for changing the stable state thereof, a mismatch detecting bistable embodiment operative in response to binary 0 and 1 signals respectively appearing on said first and second conductors for changing the stable state thereof, and output control means operative in response to said mismatch embodiment changing state for functioning in accordance with the particular state characterizing said counting bistable embodiment.

11. A combination as in claim 10, further comprising means for selectively inhibiting the switching of said counting bistable embodiment.

12. A combination as in claim 11, further comprising delaying means connected between said mismatch detecting bistable embodiment and said selectively inhibiting means.

No references cited.

DARYL W. COOK, *Acting Primary Examiner.*

W. J. KOPACZ, *Assistant Examiner.*